US008909251B2

(12) United States Patent
Agarwal et al.

(10) Patent No.: US 8,909,251 B2
(45) Date of Patent: Dec. 9, 2014

(54) LOCALIZATION OF MOBILE COMPUTING DEVICES IN INDOOR ENVIRONMENTS

(71) Applicant: Microsoft Corporation, Redmond, WA (US)

(72) Inventors: Sharad Agarwal, Seattle, WA (US); Ivan Tashev, Kirkland, WA (US); Paramvir Bahl, Bellevue, WA (US); Ionut Constandache, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 14/019,579

(22) Filed: Sep. 6, 2013

(65) Prior Publication Data

US 2013/0344893 A1    Dec. 26, 2013

Related U.S. Application Data

(63) Continuation of application No. 13/215,230, filed on Aug. 23, 2011, now Pat. No. 8,548,494.

(51) Int. Cl.

| | |
|---|---|
| *H04W 24/00* | (2009.01) |
| *G01S 5/20* | (2006.01) |
| *G01S 19/48* | (2010.01) |
| *G06Q 90/00* | (2006.01) |
| *G06Q 50/22* | (2012.01) |
| *H04W 4/04* | (2009.01) |

(52) U.S. Cl.
CPC .. *H04W 4/04* (2013.01); *G01S 5/20* (2013.01); *G01S 19/48* (2013.01); *G06Q 90/20* (2013.01); *G06Q 50/22* (2013.01)
USPC ................. 455/456.1; 455/404.2; 381/58

(58) Field of Classification Search
USPC ............... 455/3.06, 404.2; 381/17, 20, 58, 92
See application file for complete search history.

(56) References Cited

U.S. PATENT DOCUMENTS

| | | | |
|---|---|---|---|
| 7,394,907 B2 | 7/2008 | Tashev | |
| 7,583,808 B2 | 9/2009 | Smaragdis et al. | |
| 2009/0285409 A1 | 11/2009 | Yoshizawa et al. | |
| 2010/0069087 A1* | 3/2010 | Chow et al. ................ | 455/456.1 |
| 2013/0053053 A1 | 2/2013 | Agarwal et al. | |

OTHER PUBLICATIONS

Bian, et al., "Using Sound Source Localization in a Home Environment", Retrieved at <<http://www.sps.ele.tue.nl/members/O.Amft/teaching/UCAR/Bian2005-P_Pervasive.pdf>>, May 8, 2005, pp. 19-36.

(Continued)

*Primary Examiner* — Vladimir Magloire
(74) *Attorney, Agent, or Firm* — Steve Wight; Judy Yee; Micky Minhas (57) ABSTRACT

Various technologies pertaining to localizing multiple mobile computing devices in an indoor environment are described. Pairs of microphone arrays are selectively positioned in an indoor environment. A localization service assigns a frequency and schedule to a mobile telephone, and the mobile telephone begins outputting vibrations at the assigned frequency and in conformance with the assigned schedule. The microphone arrays sense the vibrations, and angles between the microphone arrays, respectively, and the mobile computing device are computed based upon the sensed vibrations. Such angles are subsequently employed to compute the location of the mobile computing device in the indoor environment.

19 Claims, 7 Drawing Sheets

(56) References Cited

OTHER PUBLICATIONS

Elahi, et al., "Sound Localization and Tracking using Distributed Microphones Fusion: Maximum Likelihood or Maximum A-Posteriori approach?", Retrieved at <<http://ieeexplore.ieee.org/stamp/stamp.jsp?tp=&arnumber=4909221>>,In the Proceedings of IEEE International Conference on Computer,Control and Communication 2009, Feb. 17, 2009, pp. 1-6.

Bian, et al., "Using Sound Source Localization to Monitor and Infer Activities in the Home", Retrieved at <<http://smartech.gatech.edu/bitstream/handle/1853/3729/04-20.pdf?sequence=1, 2004, pp. 1-16.

Strobel, et al., "Speaker Localization Using a Steered Filter-And-Sum Beamformer", Retrieved at <<http://citeseerx.ist.psu.edu/viewdoc/download?doi=10.1.1.33.8181&rep=rep1&type=ps>>, Nov. 17-19, 1999, pp. 1-8.

Chen, et al., "Speaker Tracking and Identifying Based on Indoor Localization System and Microphone Array", Retrieved at <<http://ieeexplore.ieee.org/stamp/stamp.jsp?tp=&arnumber=4224128>>, 21st International Conference on Advanced Information Networking and Applications Workshops (AINAW'07), May 21, 2007, pp. 1-6.

"Triangulation—Localization by Computing Angles Relative to Two Fixed, known Locations", Retrieved at <<http://en.wikipedia.org/wiki/Triangulation>>, Retrieved Date : May 24, 2011, p. 1.

Aarabi, Parham, "The Fusion of Distributed Microphone Arrays for Sound Localization", Retrieved at<<http://downloads.hindawi.com/journals/asp/2003/860465.pdf>>, EURASIP Journal on Applied Signal Processing, 2003, pp. 338-347.

Bian, et al., "Using Sound Source Localization in a Home Environment", Retrieved at <<http://www.sps.ele.tue.nl/members/O.Amft/teaching/UCAR/Bian2005-P_Pervasive.pdf>>, 2005, pp. 1-18.

Borriello, et al., "Walrus: Wireless Acoustic Location with Room-level Resolution Using Ultrasound", Retrieved at <<http://www.usenix.org/event/mobisys05/tech/full_papers/borriello/borriello.pdf>>, MobiSys '05: The Third International Conference on Mobile Systems, Applications, and Services, 2005, pp. 191-203.

Filonenko, et al., "Investigating Ultrasonic Positioning on Mobile Phones", Retrieved at <<http://arrow.dit.ie/cgi/viewcontent.cgi?article=1046&context=dmcart&sei-redir=1#search="Investigating+ultrasonic+positioning+on+mobile+phones", International Conference on Indoor Positioning and Indoor Navigation (IPIN), 2010 , pp. 1-9.

Harter, et al., "The Anatomy of a Context-Aware Application", Retrieved at <<http://citeseer.ist.psu.edu/viewdoc/download;jsessionid=7363463BA9D5AC3A5D18BB6F43A6F1E4?doi=10.1.1.12.1285&rep=rep1&type=pdf>>, In Proceedings of the 5th annual ACM/IEEE international conference on Mobile computing and networking,MobiCom, 1999, pp. 59-68.

Hazas, et al., "Broadband Ultrasonic Location Systems for Improved Indoor Positioning", Retrieved at <<http://citeseer.ist.psu.edu/viewdoc/download?doi=10.1.1.61.8792&rep=rep1&type=pdf>>, IEEE Transactions on Mobile Computing, vol. 5, No. 5, May 2006, pp. 536-547.

Hu, et al., "Simultaneous Localization of Mobile Robot and Multiple Sound Sources using Microphone Array", Retrieved at <<http://www.csie.ntu.edu.tw/~bobwang/Papers/hu_icra09.pdf>>, In Proceedings of the 2009 IEEE International Conference on Robotics and Automation, ICRA'09, 2009, pp. 1-6.

Lopes, et al., "Localization of Off-the-Shelf Mobile Devices Using Audible Sound: Architectures, Protocols and Performance Assessment", Retrieved at <<http://luci.ics.uci.edu/websiteContent/weAreLuci/biographies/faculty/djp3/LocalCopy/p38-lopez(2).pdf>>,In the Proceedings of IEEE Consumer Communications and Networking Conference, Jan. 2005, pp. 38-50.

Muthukrishnan, et al., "Position Estimation from UWB Pseudorange and Angle-of-Arrival: A Comparison of Non-Linear Regression and Kalman Filtering", Retrieved at <<http://citeseerx.ist.psu.edu/viewdoc/download?doi=10.1.1.150.8241&rep=rep1&type=pdf>>, 2009, pp. 1-18.

Priyantha, et al., "The Cricket Location-Support System", Retrieved at <<http://graphics.stanford.edu/courses/cs428-03-spring/Papers/readings/Location/Balakrishnan_cricket_mobicom00.pdf>>, In Proceedings of the 6th annual International Vonference on Mobile Computing and Networking, MobiCom, Aug. 2000, pp. 1-12.

Raykar, et al., "Tracking a Moving Speaker Using Excitation Source Information",Retrieved at <<http://citeseerx.ist.psu.edu/viewdoc/download;jsessionid=2647D332E40F3E49B4CE291349031F1-E?doi=10.1.1.112.9641&rep=rep1Mype=pdf>>, In Proceedings of the 8th Eur. Conf. Speech Communication Technology (Eurospeech 2003), 2003, pp. 1-4.

Valin, et al., "Robust Localization and Tracking of Simultaneous Moving Sound Sources Using Beamforming and Particle Filtering", Retrieved at <<http://aus-www.rasip.fer.hr/cgi-bin/rokovnik/viewfile/Main/Bazenldeja?rev=1;filename=LocalizationBeamformingParticleFilt.pdf>>, Robotics and Autonomous Systems, Aug. 23, 2006, pp. 1-13.

Valin, et al., "Robust Sound Source Localization Using a Microphone Array on a Mobile Robot", Retrieved at <<http://ieeexplore.ieee.org/stamp/stamp.jsp?tp=&arnumber=1248813>>, Proceedings of the 2003 IEEE/RSJ International Conference on Intelligent Robots and Systems, Oct. 2003, pp. 1228-1233.

Vermaak, et al., "Nonlinear Filtering for Speaker Tracking in Noisy and Reverberant Environments", Retrieved at <<http://ieeexplore.ieee.org/stamp/stamp.jsp?tp=&arnumber=940294>>,In Proceedings of the Acoustics, Speech, and Signal Processing, 2001. on IEEE International Conference, 2001, pp. 3021-3024.

Ward, et al., "Particle Filtering Algorithms for Tracking an Acoustic Source in a Reverberant Environment", Retrieved at <<http://www.eric-lehmann.com/Papers/WarLehWil03Particle.pdf, IEEE Transactions on Speech and Audio Processing, vol. 11, No. 6, 2003, pp. 826-836.

Ward, Andrew Martin Robert, "Sensor-driven Computing", Aug. 1998, Corpus Christi College, University of Cambridge, pp. 1-187.

* cited by examiner

LOCALIZATION OF MOBILE COMPUTING DEVICES IN INDOOR ENVIRONMENTS

RELATED APPLICATION

This application is a continuation of U.S. patent application Ser. No. 13/215,230, filed on Aug. 23, 2011, and entitled "LOCALIZATION OF MOBILE COMPUTING DEVICES IN INDOOR ENVIRONMENTS", the entirety of which is incorporated herein by reference.

BACKGROUND

A factor contributing to the rapid proliferation of smart phones and other mobile computing devices is the incorporation of sensors into these devices. Specifically, mobile computing devices can be equipped with many different types of sensors, including, but not limited to, a geolocation sensor (e.g. a global positioning system (GPS) sensor), a camera, a microphone, a velocity sensor, an accelerometer, a proximity sensor, combinations thereof, and so on. The incorporation of such sensors into mobile computing devices has contributed to a rise in a number of applications that perform a service based at least in part upon readings from such sensors. In an example, a mapping application can receive a current location of a user (from a geolocation sensor in a mobile computing device of the user that outputs location data) and can present the user with a map of a region immediately surrounding such user, as well as driving directions to different locations based upon the data from the geolocation sensor.

The mapping application described above only operates effectively, however, if the mobile computing device that includes the geolocation sensor is outdoors or proximate to a window, as conventional geolocation sensors rely upon receiving data from satellites to output location information. Therefore, if the mobile computing device is in an indoor environment and not proximate to a window, the geolocation sensor will be unable to output data that is indicative of the location of the mobile computing device. Location of a mobile telephone can be computed in an indoor environment by triangulating cellular network signals. Cellular towers typically output beacon signals, and a mobile computing device, at a given point in time, may receive beacon signals from multiple cellular towers. Based upon the signal strength of the beacon signals, the mobile computing device can estimate its location relative to the cellular towers. If the location of the cellular towers is known, the mobile computing device can estimate a global position of such mobile computing device.

The estimated position, however, of the mobile computing device is relatively inaccurate. For example, if the user of the mobile computing device is indoors at a particular address, the mobile computing device can determine that the mobile computing device is somewhat proximate to that address. For the purposes of an emergency response, however, the approximated location may be insufficiently accurate.

SUMMARY

The following is a brief summary of subject matter that is described in greater detail herein. This summary is not intended to be limiting as to the scope of the claims.

Described herein are various technologies pertaining to localizing a mobile computing device in an indoor environment. An indoor environment can be equipped with at least two microphone arrays, wherein each of the microphone arrays comprises a plurality of microphones. Pursuant to an example, the microphone arrays can be selectively positioned near the ceiling of the indoor environment to facilitate reduction of obstacles between a source of vibration and the microphone arrays.

As a mobile computing device approaches the indoor environment (as evidenced by a GPS sensor output, triangulation of cellular signals, or the like), the mobile computing device can register with a localization service, wherein the localization service can be executed in one or more computing devices in the indoor environment or in a cloud computing system. Registering the mobile computing device with such service can comprise assigning a frequency and/or schedule to the mobile computing device, wherein the frequency causes a speaker on the mobile computing device to output vibrations at the assigned frequency, and the schedule defines times that the mobile computing device outputs vibrations by way of the speaker. The localization service can assign the frequency and schedule in such a way that vibrations (tones) output by the speaker of the mobile computing device do not interfere with vibrations output by speakers of other mobile computing devices that are in the indoor environment.

The microphone arrays can sense vibrations output by the speaker of the mobile computing device and, in an exemplary embodiment, can transmit a signal that is representative of sensed vibration to the localization service. The localization service, based upon such signal, can compute a first angle between the mobile computing device and a first microphone array and a second angle between the mobile computing device and a second microphone array. Based at least in part upon these two angles, the localization service can compute a location of the mobile computing device relative to the first and second microphone arrays. If the global positions of the first and second microphone arrays are known, an accurate position (e.g. within 2 feet) of the mobile computing device in the indoor environment can be computed.

As collisions are avoided through the assignation of the frequency and scheduling described above, the localization service can compute locations of several different mobile computing devices concurrently in the indoor environment. The computed locations can be employed, for example, in connection with providing emergency medical responders with accurate location of an individual. In another example, the computed locations can be employed in connection with monitoring human traffic over a region of interest. In still yet another example, the computed locations can be employed in connection with provision of content to an individual based at least in part upon the location of the mobile computing device.

Other aspects will be appreciated upon reading and understanding the attached Figures and description.

DETAILED DESCRIPTION

Various technologies pertaining to computing locations of numerous multiple mobile computing devices in an indoor environment will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Figure 1:
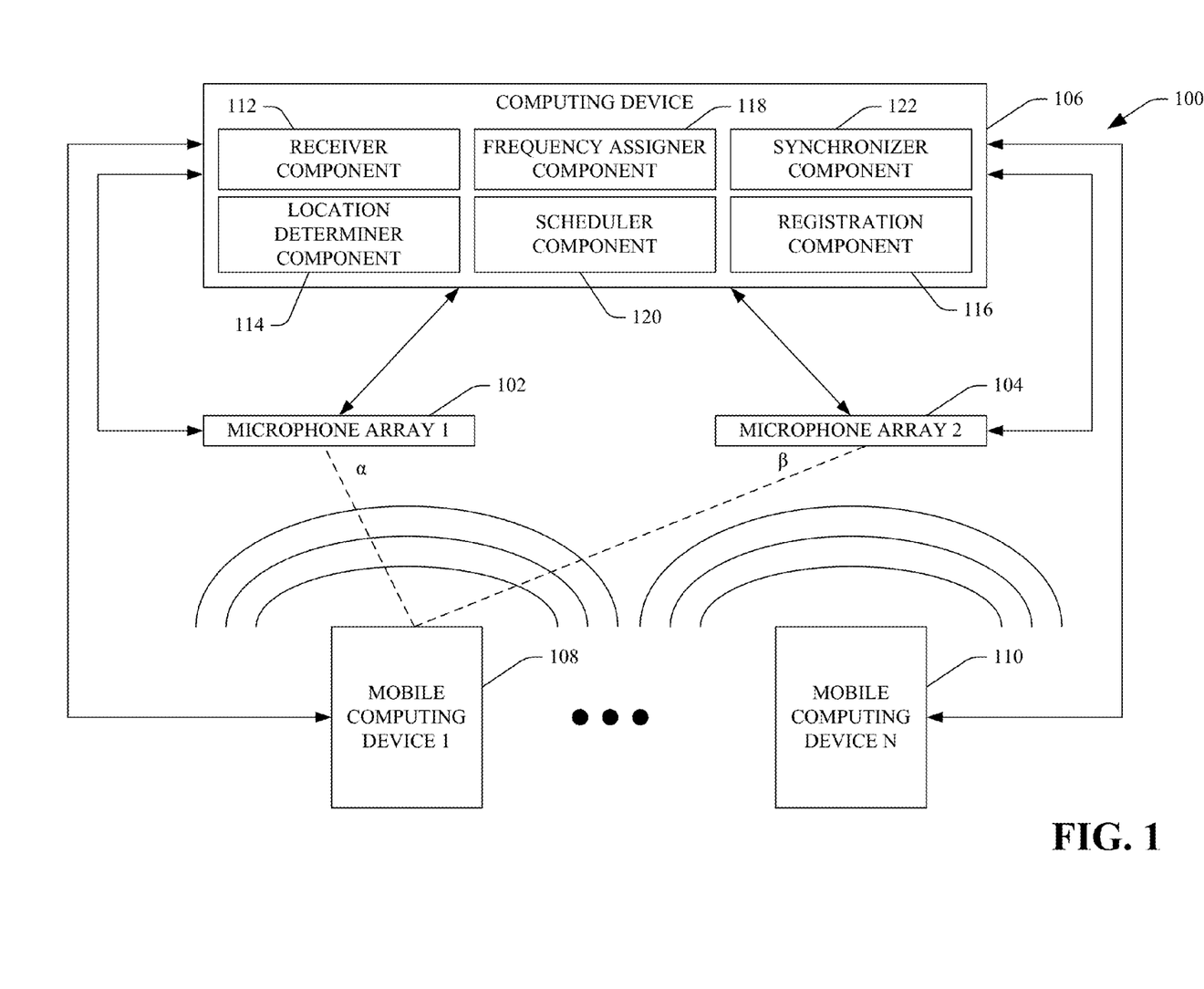
FIG. 1 is a functional block diagram of an exemplary system that facilitates computing a location of a mobile computing device in an indoor environment.

Referring now to FIG. 1, an exemplary system 100 that facilitates dynamically computing locations of multiple computing devices in an indoor environment is illustrated. The system 100 comprises a first microphone array 102 and a second microphone array 104. The first microphone array 102 and the second microphone array 104 may each include a plurality of microphones. For instance, each of the first microphone array 102 and the second microphone array 104 may comprise four microphones, six microphones, eight microphones, etc. The microphones in the microphone arrays 102 and 104 can be arranged in a single dimension, such that the microphones form a straight line in the microphone array 102 or 104. In another example, the microphones in the microphone arrays 102-104 can be arranged in the form of a matrix. In any event, the microphone arrays 102-104 may be relatively small in size, such that they are not aesthetically distracting when positioned in the indoor environment. Pursuant to an example, the microphone arrays 102-104 can be selectively positioned in the indoor environment to minimize obstructions that may exist between the microphone arrays 102-104 and sources of vibrations that are desirably detected by the microphone arrays 102-104. For instance, the microphone arrays 102-104 may be positioned on a ceiling of the indoor environment. While the examples described herein refer to use of multiple microphone arrays, in an exemplary embodiment, two-dimensional sound source localization can be undertaken using a single microphone array if geometry of the microphone array is not linear (e.g., a square-shaped four element array).

The system 100 further comprises a computing device 106 that is in communication with the microphone arrays 102 and 104 (directly or indirectly). Accordingly, the computing device 106 may be a computing device that is located in the indoor environment and is in direct communication with the microphone arrays 102 and 104. In another exemplary embodiment, the computing device 106 can be located in a cloud computing system and can be in communication with the microphone arrays 102 and 104 by way of a suitable network connection. Therefore, the computing device 106 may be located external to the indoor environment.

A plurality of mobile computing devices 108-110, which may be or include a mobile telephone, a portable media player, a tablet computing device, a netbook, or the like can be configured to output vibrations by way of their respective speakers at a defined frequency and/or schedule. For instance, these vibrations may be at frequencies that are typically unable to be heard by the human ear. Therefore, for example, the frequencies can be at 18 kHz, 20 kHz, 40 kHz, or the like. In other words, the speakers of the mobile computing devices 108-110 can be configured to output vibrations at ultrasonic frequencies in accordance with a predefined schedule.

The microphone arrays 102-104 are configured to sense/detect vibrations output by the speakers of the mobile computing devices 108-110. In an exemplary embodiment, the microphone arrays 102-104 can comprise some processing capabilities, such that vibrations sensed by the microphone arrays 102-104 can be subjected to at least some processing at such arrays 102-104. For instance, the microphone arrays 102-104 may each include a field programmable gate array (FPGA), a digital signal processor (DSP), or some other suitable processing module. Moreover, the mobile computing devices 108-110 can be configured to encode data in vibrations output by the speakers thereon that respectively identifies the mobile computing devices 108-110. Pursuant to an example, the mobile computing devices 108-110 can utilize amplitude modulation techniques in connection with encoding the vibrations to identify the mobile computing devices 108-110, respectively.

An example will now be described herein with respect to the first mobile computing device 108. It is to be understood, however, that processing described herein can be undertaken with respect to other mobile computing device in the indoor environment. As mentioned above, the first mobile computing device 108 can output vibrations at a certain frequency and/or in accordance with a particular schedule. The first and second microphone arrays 102-104 can sense the vibrations output by the first mobile computing device 108 and can detect the frequency of the vibrations. Additionally, in an exemplary embodiment, the first microphone array 102 can determine the identity of the mobile computing device 108 by analyzing an encoded signal in the vibrations output by the first mobile computing device 108. Furthermore, the first microphone array 102 can additionally compute directional information (an angle α) between the first microphone array 102 and the first mobile computing device 108.

Likewise, the second microphone array 104 can detect the frequency of the vibrations output by the first mobile computing device 108, can determine the identity of the mobile computing device 108 that is encoded in the vibrations, and can compute directional information (an angle β) between the first mobile computing device 108 and the second microphone array 104. Subsequently, each of the first microphone array 102 and the second microphone array 104 can transmit such data (identity of the first mobile computing device 108, the frequency of vibrations output by the first mobile computing device 108, and the angles α and β between the respective microphone arrays 102 and 104 and the first mobile computing device 108) to the computing device 106. Alternatively, the microphone arrays 102-104 may fail to include sufficient processing capabilities (either a FPGA or DSP) and can transmit a signal (e.g. either a digital or analog signal) that is representative of detected vibrations to the computing device 106.

The computing device 106 comprises a receiver component 112 that receives a first signal from the first microphone array 102 and a second signal from the second microphone array 104. As discussed above, these signals from the first microphone array 102 and the second microphone array 104 can be indicative of vibrations sensed by the first microphone array 102 and the second microphone array 104 that are output by a speaker, for instance, on the first mobile computing device 108. Such signals can either be the detected frequency, the identity of the mobile computing device 108 and the angles α and β between the microphone arrays 102 and 104, respectively, and the first mobile computing device 108, or an analog or digital signal that is directly passed from the microphone arrays 102-104 to the computing device 106.

The computing device 106 additionally comprises a location determiner component 114 that computes a location of the first mobile computing device 108 relative to the first microphone array 102 and the second microphone array 104 based at least in part, upon the first signal received from the first microphone array 102 and the second signal received from the second microphone array 104. With more particularity, if the first and second microphone arrays 102-104 compute and transmit the angles α and β to the computing device 106, then the location determiner component 114 can compute the location of the first mobile computing device 108 relative to the microphone arrays 102 and 104 through triangulation. The location determiner component 114 can have knowledge of the location of the microphone arrays 102 and 104 in the indoor environment, and can thus compute the location of the first mobile computing device 108 in the indoor environment. Pursuant to an example, this location can be computed relatively accurately (e.g. within 2 feet of the actual location of the mobile computing device 108). If the microphone arrays 102-104 lack signal processing capabilities, then the location determiner component 114 can receive the signals from the microphone arrays 102-104 and can determine the frequency of the vibrations output by the mobile first computing device 108, the identity of the first mobile computing device 108, and the angles α and β.

The location determiner component 114 can also be configured to employ various techniques to monitor, track, and predict location of mobile computing devices in the indoor environment. For example, the location determiner component 114 can combine location data from one or more microphone arrays, cause such information to be stored in electronic format in a data repository, and can register and track multiple mobile computing devices in the indoor environment. The location determiner component 114 can employ averaging in time, clustering, and tracking algorithms to facilitate proper location prediction (even between actual locations and to extrapolate and predict most probable location of mobile computing devices in the future). Further, the location determiner component 114 can generate confidence levels and precision estimates of locations of mobile computing devices in the indoor environment.

Additional detail pertaining to locating the first mobile computing device 108 in the indoor environment is now provided. The mobile computing device 108 may have an application thereon that is configured to register with the computing device 106 and cause a speaker on the first mobile computing device 108 to output vibrations at specified frequencies and time intervals. The application can be configured to register with the computing device 106, for instance, when the first mobile computing device 108 becomes proximate to the indoor environment, as can be ascertained through triangulation of cellular telephone signals, through GPS readings generated by the mobile computing device 108, manual indication from a user, or the like. As used in this context, the term "proximate" is intended to encompass distances of up to 200 feet between the first mobile computing device 108 and the indoor environment.

Upon the application on the first mobile computing device 108 being initiated, the application on such device 108 can transmit a message to the computing device 106 by way of a wireless network connection (e.g. Wi-Fi, WiMAX, cellular, etc.). The computing device 106 comprises a registration component 116 that registers the first mobile computing device 108 with the computing device 106 (and thus with the localization service). The registration component 116 can receive data pertaining to the first mobile computing device 108, including, but not limited to, data that identifies the first mobile computing device 108, a type of hardware included in the first mobile computing device 108 (a type of speaker that is included in the mobile computing device 108, an operating system of the mobile computing device 108, a processor used in the mobile computing device 108, amongst other information).

The computing device 106 can further comprise a frequency assigner component 118 that selectively assigns a frequency to the first mobile computing device 108. Generally, mobile computing devices will have speakers that are not configured to output vibrations at higher frequencies. Accordingly, a number of ultrasonic frequencies that can be assigned to the mobile computing device 108 may be limited to a relatively small number of frequencies. In a particular example, the frequency assigner component 118 may have a relatively small number of frequencies to choose from when assigning frequencies to mobile computing devices. This number of frequencies, for instance, may be 8, 6, 4, 2, or 1. The frequency assigned to the first mobile computing device 108 by the frequency assigner component 118 can be transmitted from the computing device 106 to the first mobile computing device 108 by way of the aforementioned wireless network connection. The first mobile computing device 108, upon receiving the assigned frequency, will be configured to output vibrations by way of the speaker on the first mobile computing device 108 at the assigned frequency. The assignation of different frequencies to different mobile computing devices in the indoor environment facilitates prevention of collision of vibrations output by multiple mobile computing devices. Accordingly, the first microphone array 102 and the second microphone array 104 can detect vibrations from different mobile computing devices that are at different frequencies at a single instance in time.

As mentioned above, the frequency assigner component 118 may have a limited number of frequencies that can be assigned to numerous (e.g. 10, 20, 30, 40, 100) mobile computing devices in the indoor environment. The computing device 106 further comprises a scheduler component 120 that is configured to assign a schedule to the first mobile computing device 108, wherein the schedule defines when the mobile computing device 108 is to output vibrations at the assigned frequency. In other words, the scheduler component 120 can assign timeslots to the first mobile computing device 108. The schedule assigned to the first mobile computing device 108 can ensure that vibrations output by the speaker of the first mobile computing device 108 will not interfere with vibrations output by speakers of other mobile computing devices in the indoor environment. That is, if the first mobile computing device 108 and the Nth mobile computing device 110 are assigned a same frequency, the schedules respectively assigned to the first mobile computing device 108 and the Nth mobile computing device 110 will ensure that the mobile computing devices 108 and 110 are not simultaneously outputting vibrations at the same frequency.

The registration component 116, the frequency assigner component 118, and the scheduler component 120 can act in conjunction to monitor the mobile computing devices in the indoor environment, which frequencies have been assigned to which mobile computing devices, and the schedules assigned to the mobile computing devices. Accordingly, if another mobile computing device registers with the computing device 106, then a frequency and/or schedule can be assigned to such mobile computing device to prevent the mobile computing device from outputting vibrations that interfere with other vibrations output by other mobile computing devices. Similarly, schedules assigned to other mobile computing devices and/or frequencies assigned to other mobile computing devices can be changed at any time by the frequency assigner component 118 and/or the scheduler component 120 to facilitate concomitant localization of multiple computing devices in the indoor environment. When a mobile computing device leaves an area proximate to the indoor computing device (as evidenced by a GPS reading, lack of sensing a vibration output by the mobile computing device, or triangulation of cellular telephone towers), the mobile computing device can be de-registered with the computing system 106.

The computing device 106 may also include a synchronizer component 122 that can synchronize clocks in the mobile computing devices 108-110 to prevent errors that may occur due to clock drift. For instance, the first mobile computing device 108 may include a different processor than what is included in the Nth mobile computing device 110, wherein the different processors may have different clock speeds. Over time, then, at least one of the clocks of the mobile computing devices 108 or 110 may drift sufficiently to cause one of the mobile computing devices 108-110 to output vibrations that interfere with vibrations output by another one of the mobile computing devices 108-110. The synchronizer component 122 can periodically output a synchronization signal that causes the clocks of the mobile computing devices 108-110 to be synchronized. In an exemplary embodiment, the synchronization signal can be output by the synchronizer component 122 over a Wi-Fi network connection. In another exemplary embodiment, the synchronizer component 122 may reside in a cellular telephone tower and may periodically transmit synchronization signals to all mobile computing devices that are in communication with such cellular telephone tower. Other mechanisms for synchronizing clocks of the mobile computing devices 108-110 are contemplated and are intended to fall under the scope of the hereto-appended claims.

While the system 100 has been described above as determining a location of a mobile computing device in an indoor environment using a pair of microphone arrays, it is to be understood that in an exemplary embodiment a less granular location of a mobile computing device can be ascertained using a single microphone array. For instance, a single microphone array may be employed to determine that a mobile phone is in a certain aisle of a retail store. In another exemplary embodiment, the single microphone array may be shaped in a particular pattern (L-shaped, C-shaped, U-shaped), and multiple angles between portions of the microphone array and the mobile computing device can be computed. Still further, location can be computed through analysis of signals output by more than two microphone arrays.

Figure 2:
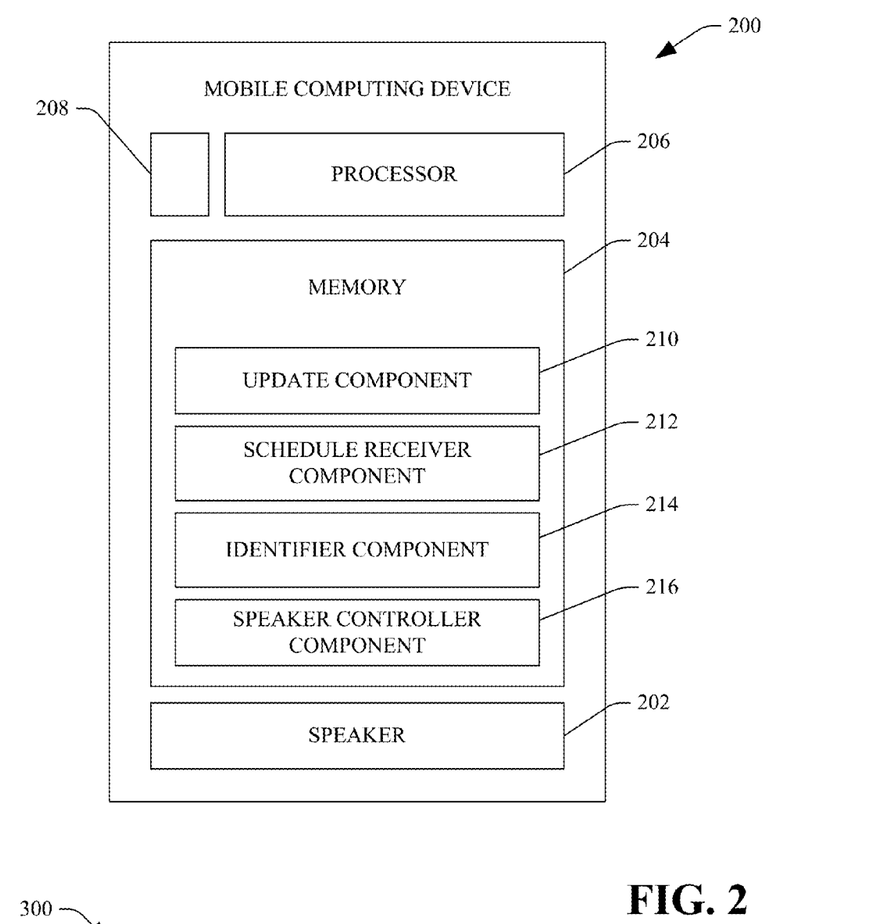
FIG. 2 is a functional block diagram of a mobile computing device that is configured to output vibrations by way of a speaker to facilitate computing a location of the mobile computing device.

With reference now to FIG. 2, an exemplary mobile computing device 200 that can be configured to output vibrations at particular frequencies and during schedule timeslots is illustrated. The mobile computing device 200 comprises a speaker 202 that is configured to output vibrations that are sonic as well as ultrasonic or near ultrasonic (e.g. 20 Hz-200 kHz). The mobile computing device 200 additionally comprises a memory 204 that comprises executable instructions. A processor 206 is configured to execute the instructions in the memory 204.

The mobile computing device 200 additionally comprises an antenna 208, which may be configured to send and receive signals by way of a cellular network. In another embodiment, the antenna 208 may be or include a Wi-Fi chipset. Accordingly, the mobile computing device 200 can send and receive data in a Wi-Fi network by way of the antenna 208.

The memory 204 includes an update component 210 that is configured to register the mobile computing device 200 with a localization system, such as the system 100. The update component 210 can monitor the geographic location of the mobile computing device 200 as ascertained from GPS sensor readings, from cellular network triangulation, etc. If the mobile computing device 200 becomes proximate to a particular indoor environment, the update component 210 can initiate registration with a localization system. For instance, the update component 210 can transmit data to the localization system that indicates an identity of the mobile computing device 200, a type of speaker included in the mobile computing device 200 (which can be analyzed to determine frequency of vibrations output by the speaker), a type of processor included in the mobile computing device 200 (to ascertain clock speed), amongst other information.

The memory 204 additionally comprises a schedule receiver component 212 that receives an assigned frequency and/or schedule from the localization system. The assigned frequency and/or schedule can be received immediately subsequent to the mobile computing device 200 registering with the localization system, and updates to the assigned frequency and/or schedule can be received any time afterwards, as necessary, to allow for simultaneous localization of multiple mobile computing devices in an indoor environment.

The memory 204 may also comprise an identifier component 214 that is configured to encode data in vibrations output by the speaker 202 that identifies the mobile computing device 200. For example, the identifier component 214 can be configured to modulate vibrations at the assigned frequency to identify the mobile computing device 200, thereby enabling differentiation between the mobile computing device 200 and other mobile computing devices in the indoor environment.

The memory 204 can further comprise a speaker controller component 216 that causes the speaker 202 to output vibrations at the assigned frequency and in conformance with the assigned schedule, wherein such vibrations include the encoded data that allows for identification of the mobile computing device 200.

Figure 3:
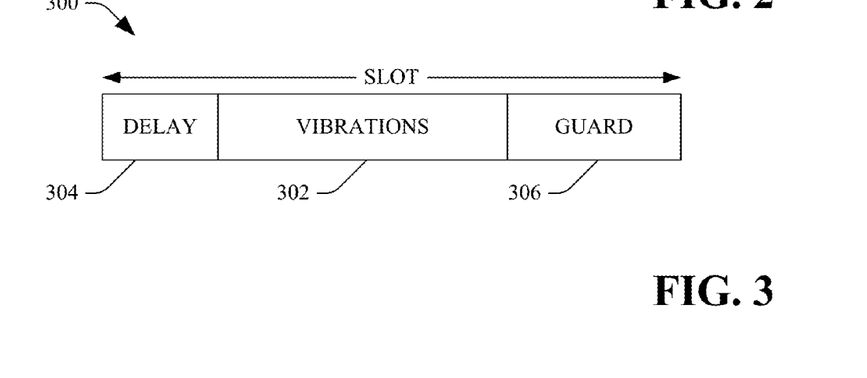
FIG. 3 illustrates an exemplary time slot that is a portion of a schedule that is utilized by a mobile computing device when outputting vibrations by way of a speaker.

With reference now to FIG. 3, an exemplary timeslot 300 that can be assigned to the mobile computing device 200 by the scheduler component 120 is illustrated. The length of the timeslot 300 can be $T_{slot}$, which represents the time interval allocated to the mobile computing device 200 to output vibrations 302 of length $T_{vibrate}$. As can be ascertained, $T_{vibrate}$ is less than $T_{slot}$. The slot 300 may further include a delay 304, which represents a delay of length $T_{delay}$ between a request for the speaker 202 to output a vibration and the speaker 202 actually outputting the vibration.

The timeslot 300 may also include a guard 306 that prevents the mobile computing device 200 from outputting the vibrations 302 concomitantly with another mobile computing device (due to slightly different clock times that may be caused by unsynchronized time, clock drift, or the like). The length of the guard 306 can be referred to as $T_{guard}$. It can be noted that $T_{slot}$ is to be set to a value that is greater than or equal to the sum of $T_{delay}$, $T_{vibrate}$, and $T_{guard}$. Such condition prevents mobile computing devices from outputting vibrations concurrently. A desired length of $T_{delay}$, $T_{vibrate}$, and $T_{guard}$ can be computed empirically.

Figure 4:
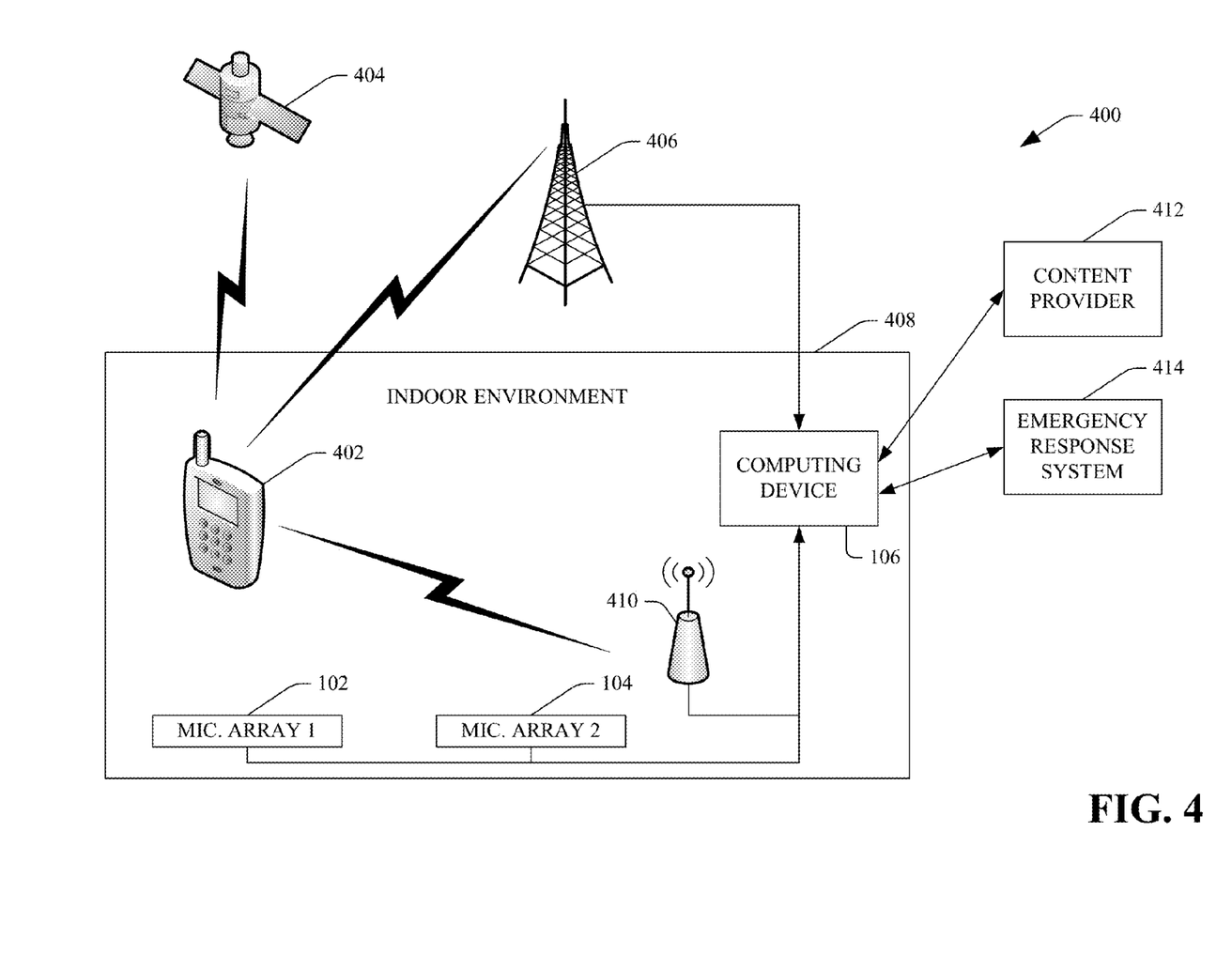
FIG. 4 illustrates an exemplary system that facilitates granularly locating a mobile computing device in an indoor environment.

With reference now to FIG. 4, an exemplary system 400 that facilitates computing a location of a mobile telephone in an indoor environment is illustrated. The system 400 comprises a mobile telephone 402, which may be, for example, a smart phone that can execute applications thereon. A GPS sensor in the mobile telephone can be in communication with at least one satellite 404, such that when the mobile telephone 402 is outdoors or proximate to a window, the GPS sensor can output location data that identifies the location of the mobile telephone 402. The mobile telephone 402 may also be in communication with a cellular tower, such that voice signals and data can be received and transmitted from the mobile telephone 402 by way of a network connection between the mobile telephone 402 and the cellular tower 406.

The mobile telephone 402 may have knowledge of a location of an indoor environment 408, which may be a building, such as a retail store. The mobile telephone 402 may have an application thereon that is awoken when the mobile telephone 402 becomes proximate to the indoor environment 408 (e.g. within 100 feet). The indoor environment 408 includes a wireless access point 410, wherein the mobile telephone 402 can gain access to a wireless network by way of the wireless access point 410. For instance, the mobile telephone 402 can communicate with the computing device 106 by way of the wireless access point 410. In an example, the application executing on the mobile telephone 402 that is awoken when the mobile telephone 402 becomes proximate to the indoor environment 408 can transmit registration information to the computing device 106 by way of the wireless access point 410.

Thereafter, as described above, the computing device 106 can cause a frequency and/or schedule to be provided to the mobile telephone 402, which causes the mobile telephone 402 to output vibrations at an assigned frequency and/or in conformance with an assigned schedule. The indoor environment 408 additionally includes the first microphone array 102 and the second microphone array 104, which sense vibrations output by the speaker of the mobile telephone 402. As described above, the computing device 106 may then compute a location of the mobile telephone 402 in the indoor environment 408 relatively accurately (e.g. within 2 feet in two different dimensions).

The computing device 106 can determine locations of a plurality of mobile computing devices in the indoor environment 408. Additionally, the computing device 106, over time, can track locations of mobile computing devices in the indoor environment 408. In a retail environment, for example, this may be useful for monitoring human traffic over a plurality of aisles. The retailer may then be able to selectively place products to distribute human traffic as evenly as possible across the indoor environment 408.

Pursuant to an example, a content provider 412 may be in communication with the computing device 106, wherein the content provider 412 may wish to selectively provide content to the mobile telephone 402 depending upon the location of the mobile telephone 402 in the indoor environment 408. For instance, the user of the mobile telephone 402 may be proximate to a particular product (wherein "proximate" in this context can refer to being within 8 feet, 6 feet, 2 feet, or 1 foot). For example, the content provider 412 may wish to provide the mobile telephone 402 with an advertisement, product or service description, or a coupon for a product or service that is proximate to the mobile telephone 402 in the indoor environment 408. In another example, the indoor environment may be a museum, and the content provider 412 may provide content pertaining to an artifact, such as an audio or video clip that describes the artifact that is proximate to the user of the mobile telephone 402.

In another exemplary embodiment, an emergency response system 414 may desirably cause an emergency responder to quickly locate the user of the mobile telephone 402 if the user of the mobile telephone 402 requests emergency assistance. In such situation, the computing device 106 can transmit a most recent or interpolated location of the mobile telephone 402 to the emergency response system 414, which may then dispatch an emergency responder to the location of the mobile telephone 402 in the indoor environment 408.

While the systems described above have pertained to computing locations of mobile computing devices in indoor environments, it is to be understood that a user of a mobile computing device has the ability to opt in to having their location computed. For instance, with respect to a retail establishment, the user of a mobile computing device may be incentivized to allow their location to be computed (anonymously), so that the user can receive advertisements or coupons for particular products in the indoor environment 408. The user of the mobile computing device may disable an application thereon that facilitates allowing the computing device 106 to compute the location of the mobile telephone 402. It is to be ascertained that the location of the mobile computing device 402 (and other mobile computing devices in the indoor environment 408) can allow for the identity of the user of such mobile computing devices to remain anonymous.

Figure 5:
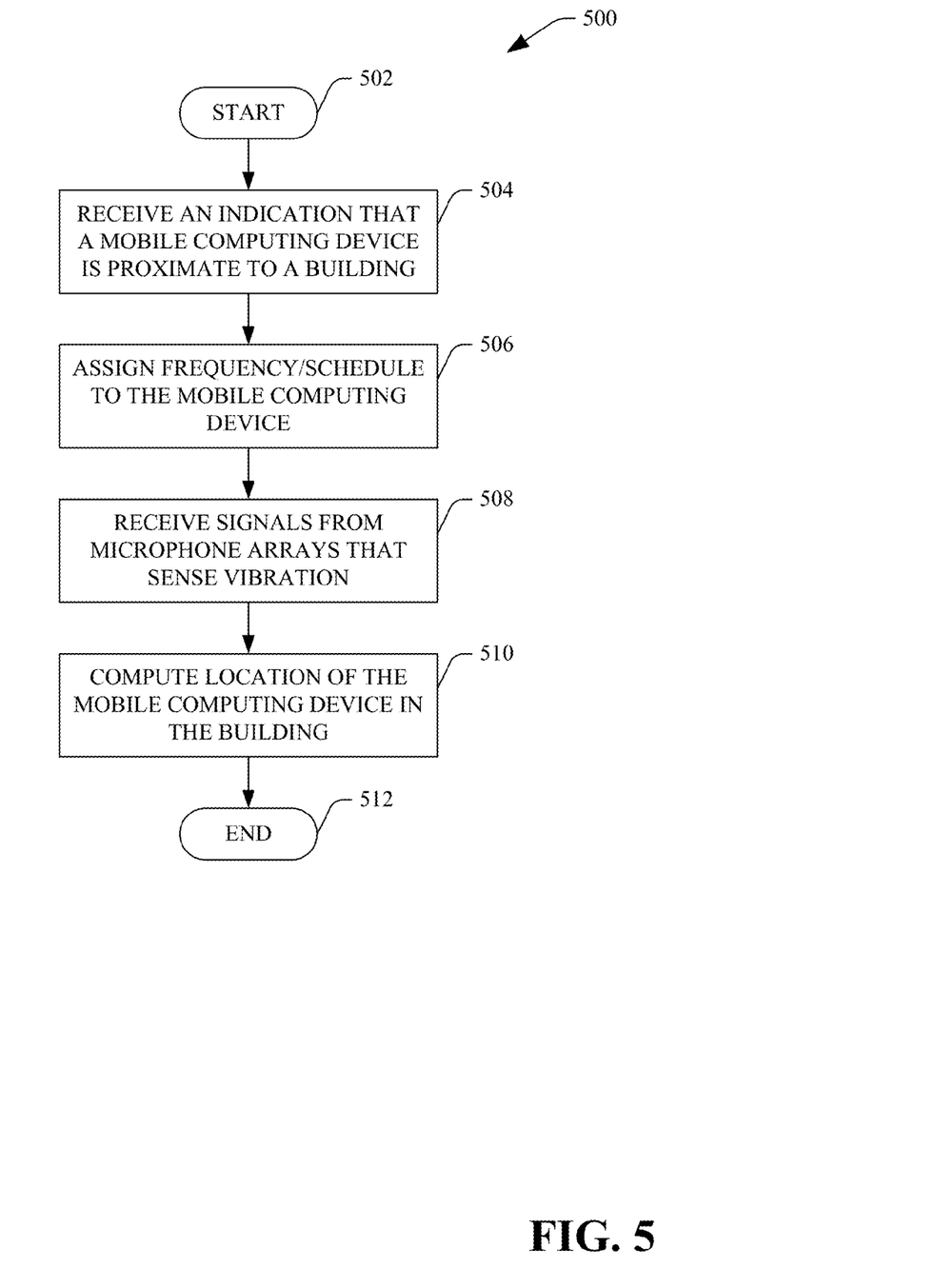
FIG. 5 is a flow diagram that illustrates an exemplary methodology for computing a location of a mobile computing device in an indoor environment.
Figure 6:
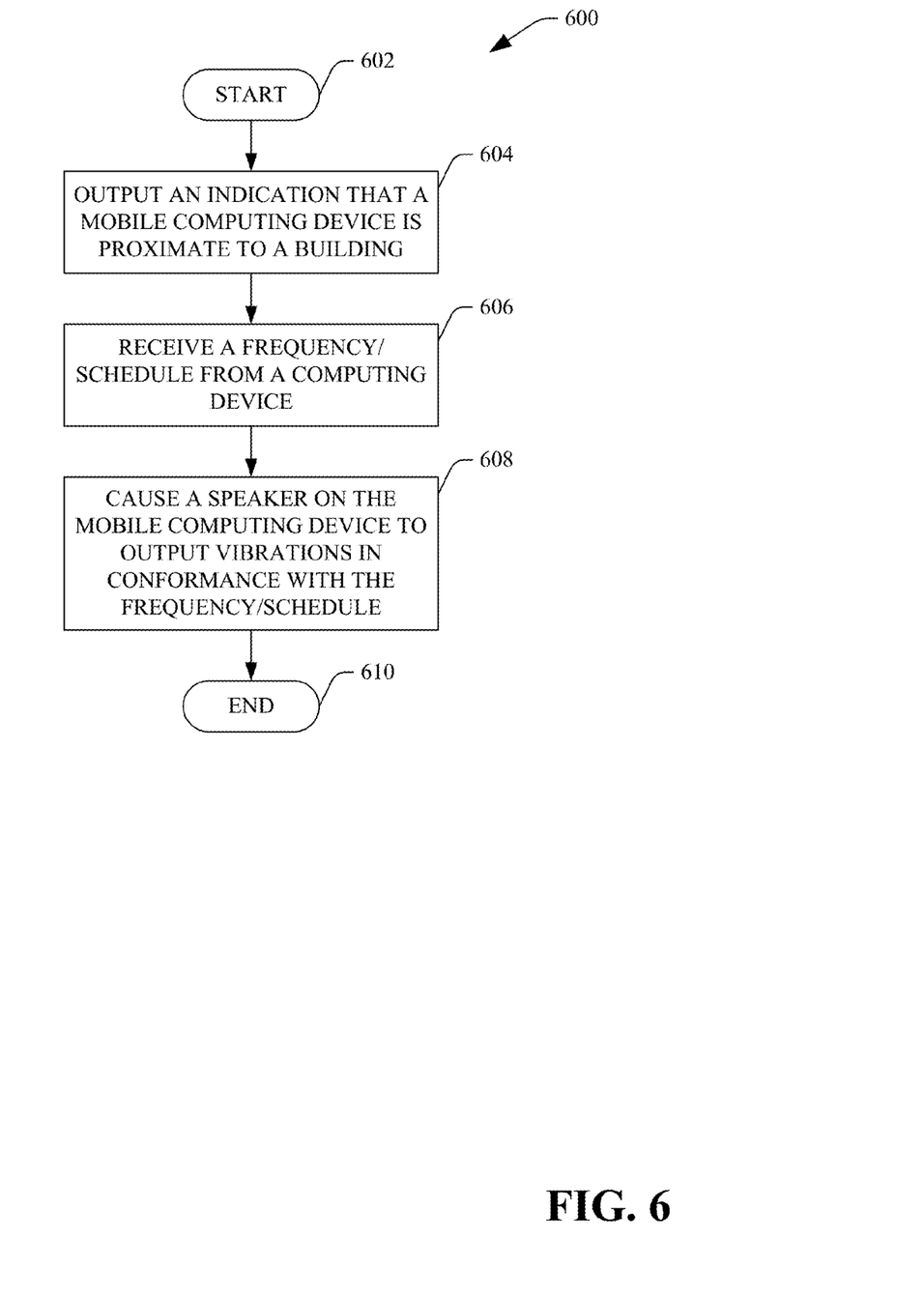
FIG. 6 is a flow diagram that illustrates an exemplary methodology for causing a speaker on a mobile computing device to output vibrations in conformance with an assigned frequency and/or schedule.
Figure 7:
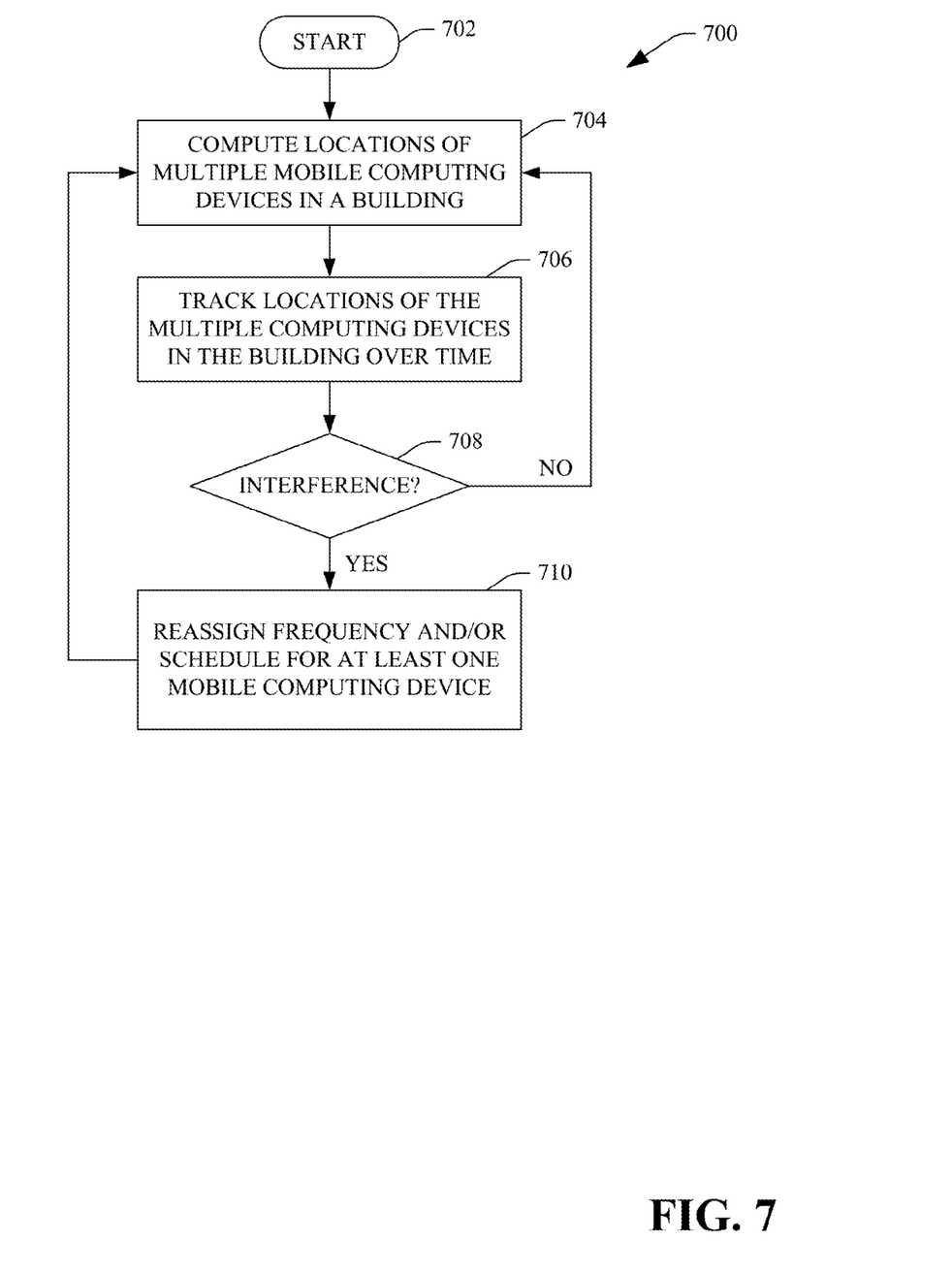
FIG. 7 is a flow diagram that illustrates an exemplary methodology for assigning frequencies and/or schedules to multiple mobile computing devices in an indoor environment to facilitate computing locations of the mobile computing devices in the indoor environment.

With reference now to FIGS. 5-7, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass a propagated signal.

Referring now to FIG. 5, an exemplary methodology 500 that facilitates computing a location of a mobile computing device in a building is illustrated. The methodology 500 starts at 502, and at 504, an indication is received that a mobile computing device is proximate to a building. As described above, the mobile computing device can ascertain that it is proximate to the building and can initiate communications with a localization system/service. The localization system/service can register the mobile computing device therewith.

At 506, a frequency and/or schedule is assigned to the mobile computing device. The frequency causes the mobile computing device to output vibrations by way of a speaker at such frequency (and not at other frequencies). The schedule causes the mobile computing device to output the vibrations in scheduled timeslots, such that the output vibrations do not interfere with vibrations output by other telephones on the same or similar frequencies.

At 508, signals from multiple microphone arrays that sense vibrations output by the mobile computing device are received. The signals are indicative of vibrations output by a speaker on the mobile computing device. In an example, the signal is a digital representation of the vibrations sensed by the microphone arrays.

At 510, the location of the mobile computing device in the building is computed based at least in part upon the received signals. For example, first the location of the mobile computing device relative to at least two microphone arrays can be computed, and thereafter, the location of the mobile computing device in the building can be ascertained (as the locations of the sensor arrays are known in the building). The methodology 500 completes at 512.

Now referring to FIG. 6, an exemplary methodology 600 that can be undertaken on a mobile telephone that facilitates localizing the mobile telephone in an indoor environment is illustrated. The methodology 600 starts at 602, and at 604 an indication is output that the mobile computing device is proximate to a building. At 606, a frequency and/or schedule is received from a localization system. As described above, the localization system may be in the building or may reside in a cloud computing system that is in communication with the mobile computing device by way of a network.

At 608, a speaker on the mobile computing device is caused to output vibrations in conformance with the frequency and/or schedule. Pursuant to an example, the frequency used to output the vibrations may be an ultrasonic frequency. The methodology 600 completes at 610.

Now referring to FIG. 7, an exemplary methodology 700 that facilitates updating frequencies and/or schedules assigned to mobile computing devices in an indoor environment is illustrated. Pursuant to an example, an indoor environment may be sectorized into a plurality of different sectors, wherein two microphone arrays are appropriately positioned in each sector. More specifically, conventional speakers in mobile computing devices are not configured to transmit ultrasonic vibrations at amplitudes that are sufficient to allow such vibrations to travel large distances (e.g. over 40 feet). In relatively large indoor environments, therefore, multiple pairs of microphone arrays can be positioned to allow the localization of mobile computing devices to occur throughout the indoor environment. Thus, a first mobile computing device in a first sector of the indoor environment may be assigned a first frequency and a first schedule, while a second mobile computing device in a second sector of the indoor environment may be assigned the first frequency at a second schedule. If the two mobile computing devices are sufficiently far apart, then vibrations output thereby (of the same frequency and at the same time), will not interfere with one another. If, however, the mobile computing devices are in adjacent sectors, then vibrations output by the first mobile computing device may interfere with vibrations output by the second mobile computing device and vice versa. Accordingly, the localization system, in such an environment, can track locations, frequencies, and schedules of multiple mobile computing devices and can update frequencies and schedules assigned to different mobile computing devices to avoid interference.

The methodology 700 starts at 702, and at 704, locations of multiple mobile computing devices in a building are computed. At 704, locations of the multiple computing devices in the building are tracked over time. This tracking, as mentioned above, can be undertaken through interpolation, through stochastic computing algorithms that output probabilistic information of current and future locations of mobile computing devices in an indoor environment, etc. Each of such mobile computing devices has been assigned a frequency and/or schedule, and the mobile computing devices output vibrations in conformance with the assigned frequency and/or schedule.

At 708, a determination is made regarding whether vibrations output by different mobile computing devices in the indoor environment will interfere with one another. If it is determined that there is no interference between vibrations output by mobile computing devices in the indoor environment, then the methodology returns to 704 where the locations of the mobile computing devices are computed and tracked. If, however, some interference is possible between vibrations output by mobile computing devices, then a frequency and/or schedule is reassigned for at least one mobile computing device in the indoor environment to avoid the aforementioned interference. Thereafter, the methodology can return to 704.

Figure 8:
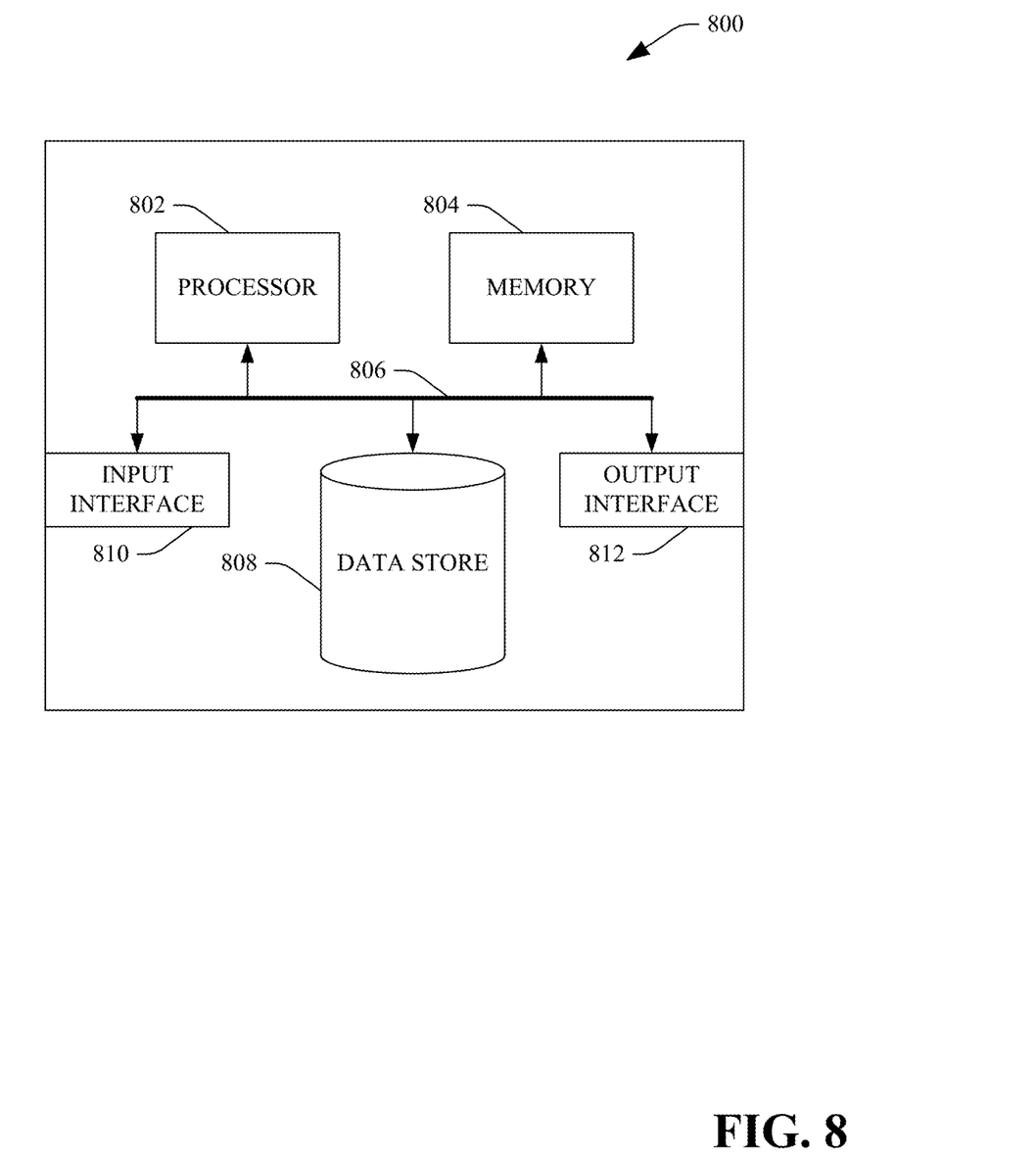
FIG. 8 is an exemplary computing system.

Now referring to FIG. 8, a high-level illustration of an exemplary computing device 800 that can be used in accordance with the systems and methodologies disclosed herein is illustrated. For instance, the computing device 800 may be used in a system that supports localizing multiple mobile computing devices in an indoor environment. In another example, at least a portion of the computing device 800 may be used in a system that supports causing a mobile computing device to output vibrations at certain ultrasonic frequencies. The computing device 800 includes at least one processor 802 that executes instructions that are stored in a memory 804. The memory 804 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store an assigned frequency and/or schedule, locations of multiple mobile computing devices, etc.

The computing device 800 additionally includes a data store 808 that is accessible by the processor 802 by way of the system bus 806. The data store may be or include any suitable computer-readable storage, including a hard disk, memory, etc. The data store 808 may include executable instructions, schedules and/or frequencies assigned to mobile computing devices, current locations of multiple mobile computing devices in an indoor environment, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method executed by a mobile computing device, the method comprising:
   receiving a signal that indicates that the mobile computing device is proximate to a predefined geographic region;
   responsive to receiving the signal, registering with a computing device that is programmed to determine a geographic location of the mobile computing device; and
   responsive to registering with the computing device, outputting an ultrasonic signal from a speaker of the mobile computing device, the ultrasonic signal being indicative of the geographic location of the mobile computing device.

2. The method of claim 1, wherein the predefined geographic region is an indoor environment.

3. The method of claim 1, wherein the ultrasonic signal is encoded to identify the mobile computing device.

4. The method of claim 1, the mobile computing device being a mobile telephone.

5. The method of claim 1, wherein registering with the computing device comprises receiving an assigned frequency from the computing device, and wherein the ultrasonic signal is output at the assigned frequency.

6. The method of claim 1, wherein registering with the computing device comprises receiving an assigned schedule from the computing device, and wherein the ultrasonic signal is output in accordance with the assigned schedule.

7. The method of claim 1, wherein registering with the computing device comprises transmitting data to the computing device that identifies at least one of a type of the speaker, an operating system executed by the mobile computing device, or a processor of the mobile computing device.

8. The method of claim 1, further comprising:
   receiving a synchronization signal from the computing device subsequent to registering with the computing device; and
   outputting a second ultrasonic signal based upon the synchronization signal.

9. The method of claim 1, wherein the predefined geographic region is an indoor retail establishment, and further comprising repeatedly outputting ultrasonic signals while the mobile computing device is proximate to the predefined geographic region.

10. The method of claim 9, further comprising:
    receiving a second signal that indicates that the mobile computing device is no longer proximate to the predefined geographic region; and
    ceasing to output ultrasonic signals responsive to receipt of the second signal.

11. A mobile computing device, comprising:
    a processor; and
    a plurality of components that are executed by the processor, the plurality of components comprising:
      an update component that, responsive to receiving an indication that the mobile computing device is proximate to a predefined geographic location, registers the mobile computing device with a localization system; and
      a speaker controller component that, responsive to the update component registering the mobile computing device with the localization system, causes a speaker of the mobile computing device to output an ultrasonic signal.

12. The mobile computing device of claim 11 being a mobile telephone.

13. The mobile computing device of claim 11, wherein the update component receives a schedule from the localization system when registering the mobile computing device with the localization system, and wherein the speaker controller component causes the speaker of the mobile computing device to output the ultrasonic signal based upon the schedule.

14. The mobile computing device of claim 11, wherein the update component receives an assigned frequency from the localization system when registering the mobile computing device with the localization system, and wherein the speaker controller component causes the speaker of the mobile computing device to output the ultrasonic signal at the assigned frequency.

15. The mobile computing device of claim 11, wherein the speaker controller component encodes an identity of the mobile computing device in the ultrasonic signal.

16. The mobile computing device of claim 11, the predefined geographic location being an indoor retail establishment.

17. A mobile telephone comprising a computer-readable medium, the computer-readable medium comprising instructions that, when executed by a processor, cause the processor to perform acts, comprising:
    receiving a signal that indicates that the mobile telephone is proximate to a predefined geographic location, the predefined geographic location being an indoor environment;
    responsive to receiving the signal, registering with a localization system that is configured to compute a location of the mobile telephone; and
    responsive to registering with the localization system, emitting an ultrasonic signal from a speaker of the mobile telephone, the ultrasonic signal usable by the localization system to compute the location of the mobile telephone.

18. The mobile telephone of claim 17, wherein registering with the localization system comprises receiving a schedule from the localization system, the acts further comprising outputting a plurality of ultrasonic signals in accordance with the schedule.

19. The mobile telephone of claim 17, wherein registering with the localization system comprises receiving an assigned frequency from the localization system, wherein the ultrasonic signal is output with the assigned frequency.

* * * * *